United States Patent Office 2,894,878
Patented July 14, 1959

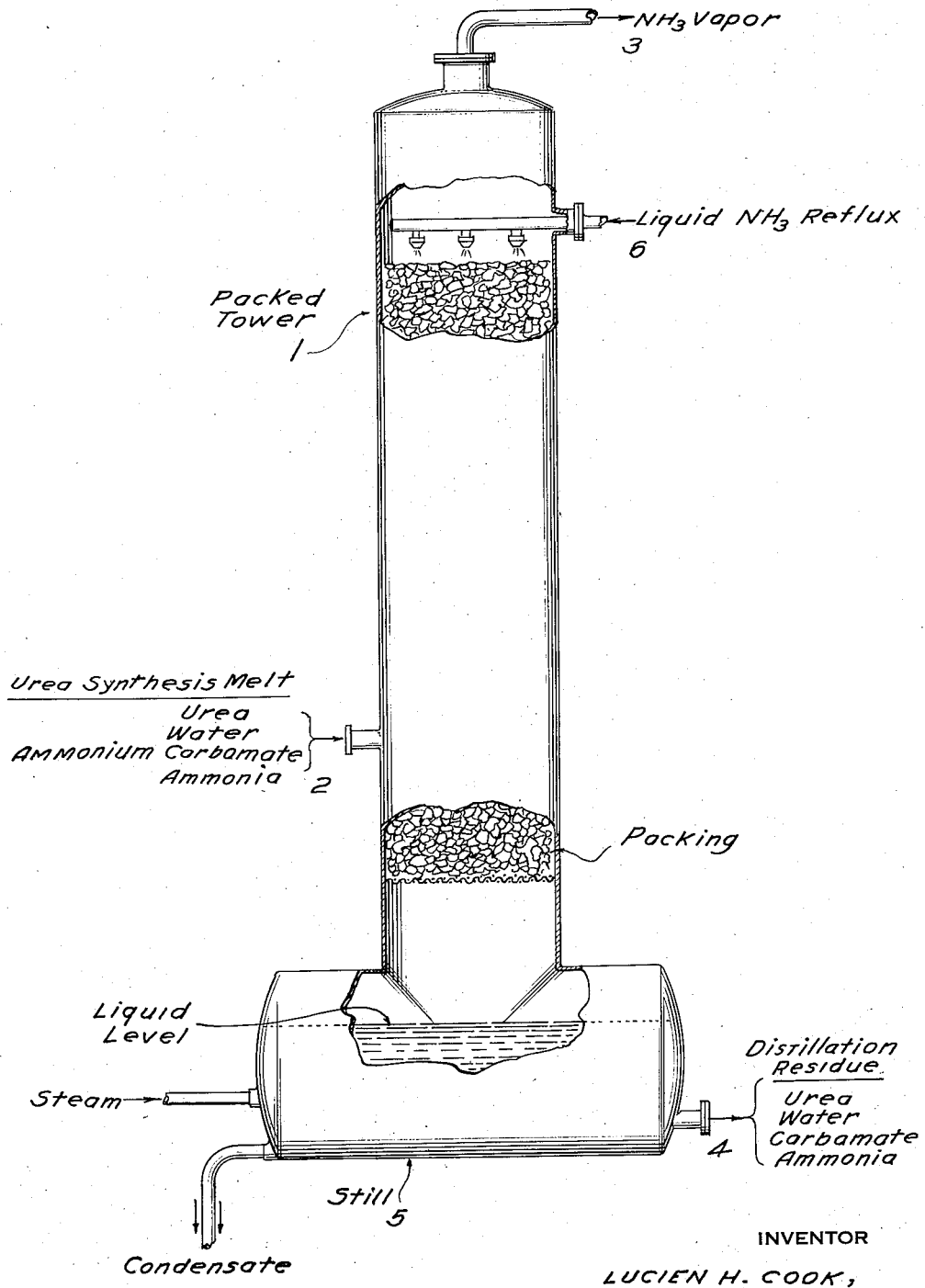

2,894,878

RECOVERY OF CARBON DIOXIDE FREE AMMONIA IN THE PRODUCTION OF UREA

Lucien H. Cook, Port Washington, N.Y., assignor to Chemical Construction Corporation, New York, N.Y., a corporation of Delaware Application March 25, 1953, Serial No. 344,521

3 Claims. (Cl. 202—40)

This invention relates to the synthesis of urea from ammonia and carbon dioxide in which an excess of ammonia over the stoichiometrical requirement is employed and more particularly to a process for the efficient recovery of the excess ammonia.

It is known that urea can be formed synthetically by heating under pressure ammonium carbamate obtained by combination of carbon dioxide and ammonia. The conversion to urea is only partial. Higher conversions are obtained when ammonia in excess of stoichiometric proportions is used, but in no case is the theoretical conversion attained. Thus the synthesis melt contains urea, water, free ammonia, and carbon dioxide (either free or combined as readily dissociated ammonium salts). In commercial practice this synthesis melt is subjected to distillation to recover the major part of its content of free ammonia.

In one such ammonia recovery procedure, the urea synthesis melt is subjected to a flash distillation. At any given pressure the temperature at which the flash distillation takes place determines the portion of the excess ammonia removed from the urea synthesis melt, with higher removal at higher temperatures. In the usual flash distillation, however, the temperature cannot be maintained high enough to obtain efficient removal of excess ammonia, since at such temperatures sufficient carbon dioxide is vaporized along with the excess ammonia to clog the condenser with solid ammonium carbamate when the ammonia is liquefied. Accordingly, to avoid clogging of the condenser with ammonium carbamate the flash distillations of the prior art were run at temperatures low enough to minimize carbon dioxide vaporization, with subsequent minimization of ammonium carbamate formation in the condenser. Running at temperatures low enough to avoid clogging the condenser thus inevitably left much of the excess ammonia in the still residue.

It is an object of this invention to provide a process for the efficient removal of excess ammonia from urea synthesis melts.

Other objects will be apparent from the following description of the invention and from the accompanying drawing, which is a representation of apparatus and flow of materials for a preferred embodiment of the invention.

In accordance with the present invention the distillation of ammonia from a urea synthesis melt is conducted in a packed tower where it comes in intimate contact with ascending vapors and descending liquid. Typical melts contain about 25 to 35% urea, 8–15% ammonium carbamate, 30–50% free ammonia and 5–15% water. Heat, which is supplied to the still by conduction from a source such as steam coils, generates vapor, which passes up through the column. Liquid ammonia is put into the top of the column to provide the downcoming stream of liquid. True countercurrent interaction between vapor and liquid such as that obtained in a packed tower is desired in the continuous countercurrent rectification of urea synthesis melts in order to bring down in the liquid phase substantially all ammonium carbamate that condenses in the system above the still. The distillation of urea synthesis melts by such continuous countercurrent rectification thus presents an advantage of great importance: a high temperature can be maintained in the still without vaporizing out undue amounts of carbon dioxide into the final ammonia vapor effluent at the top of the tower.

The specific operating conditions of the process of this invention are determined by the well-known equilibria between the liquid and vapor phases of the system urea-$NH_3$-$CO_2$-$H_2O$. I have found that the system urea-$NH_3$-$CO_2$-$H_2O$ can be treated as a two-component system of $NH_3$ and $CO_2$ for determining the operating conditions of the instant process. Hence, fixing the total pressure in the tower and the concentration of ammonia in the incoming synthesis melt fixes the concentration of ammonia in the vapor. With ammonia vapor as the overhead product the pressure and the temperature at which the still is maintained determines the compositions of the still residue. For a given composition of residue lower temperatures are required for lower pressures. The distillation may be conducted at an ammonia pressure of about 100 to 400 pounds per square inch, and preferably 225 to 230 pounds per square inch, the temperature of the incoming liquid ammonia being its condensing temperature at the corresponding pressure.

The accompanying drawing shows a packed tower 1 in which is effected the rectification of urea synthesis melt delivered by a conduit 2. A vapor discharge 3 leads from the packed tower and a liquid outlet 4 leads from the still 5. Liquid ammonia is delivered to the top of the tower by a conduit 6.

While the specific operating conditions of the invention obviously can be varied widely the following will indicate a preferred method of practicing the invention.

*Example 1*

A urea synthesis melt containing by weight approximately 30.8% urea, 9.3% water, 13.3% ammonium carbamate, and 46.6% free ammonia is delivered by conduit 2 to the packed tower 1 which is maintained at about 228 p.s.i.a. Liquid ammonia, amounting to 70% of the free ammonia in the synthesis melt is delivered by conduit 6 to the packed tower 1. The liquid in the still 5 is maintained at 110° C. Ammonia vapor at its condensing temperature is removed by a vapor discharge 3 and the distillation residue, containing by weight about 56.7% urea, 17.0% water, 24.6% ammonium carbamate, and 1.7% ammonia is removed by liquid outlet 4.

The following table illustrates the process as applied to urea synthesis melts of various compositions, treated at various temperatures and pressures. In each run the ammonia added was about 70% by weight of the free ammonia in the melt, but this figure is not critical, and is variable over the range of about 50–150%.

| Conditions | Example No. | | | | | |
|---|---|---|---|---|---|---|
| | 1 | 2 | 3 | 4 | 5 | 6 |
| Pressure—p.s.i.a. | 228 | 157 | 228 | 228 | 228 | 228 |
| Temp. (Bottoms), ° C. | 110 | 106 | 116 | 116 | 116 | 116 |
| Feed—Wgt., percent: | | | | | | |
| Urea | 30.8 | 30.8 | 30.8 | 32.9 | 29.8 | 24.7 |
| Carbamate | 13.3 | 13.3 | 13.3 | 10.6 | 16.0 | 21.3 |
| $NH_3$ | 46.6 | 46.6 | 46.6 | 46.6 | 46.6 | 46.6 |
| Water | 9.3 | 9.3 | 9.3 | 9.9 | 8.6 | 7.4 |
| Bottoms—Wgt., percent: | | | | | | |
| Urea | 56.7 | 57.0 | 57.0 | 61.1 | 53.2 | 45.3 |
| Carbamate | 24.6 | 24.8 | 24.8 | 19.7 | 29.5 | 39.2 |
| $NH_3$ | 1.7 | 1.2 | 1.2 | 1.0 | 1.4 | 1.9 |
| Water | 17.0 | 17.0 | 17.0 | 18.2 | 15.9 | 13.6 |

I claim:
1. In a process for the production of urea the im- provement in the recovery of ammonia from the high ammonia synthesis melt consisting essentially of urea, ammonium carbamate, water and ammonia which comprises feeding the molten melt into an intermediate portion of a distillation column, supplying heat to the bottom of the column to drive out susbstantially all the ammonia from the residue, returning liquid ammonia to the top of the column, the quantity of reflux being sufficient to remove all the carbon dioxide from the overhead vapor discharge.

2. The process according to claim 1 in which the pressure within the column is maintained between 100 and 400 p.s.i. and the amount of reflux being added is 50–150% by weight of the ammonia content in the urea synthesis melt; said synthesis melt comprising about 25–35% urea, 8–15% of ammonium carbamate, 30–50% free ammonia and 5–15% water.

3. The process according to claim 2 in which the pressure is about 225–230 p.s.i. and the amount of liquid ammonia returing as reflux is about 70% by weight of the ammonia content of the urea synthesis melt.

References Cited in the file of this patent

UNITED STATES PATENTS

| | | |
|---|---|---|
| 1,937,116 | Hetherington | Nov. 28, 1933 |
| 2,012,621 | Bennett | Aug. 27, 1935 |
| 2,018,863 | Miller | Oct. 29, 1935 |
| 2,056,283 | Lawrence et al. | Oct. 6, 1936 |
| 2,212,847 | Porter | Aug. 27, 1940 |
| 2,214,068 | Rogers et al. | Sept. 10, 1940 |
| 2,267,133 | Porter | Dec. 23, 1941 |
| 2,701,262 | Cook | Feb. 1, 1955 |

FOREIGN PATENTS

| | | |
|---|---|---|
| 105,826 | Great Britain | May 3, 1917 |